(12) United States Patent
Jacob et al.

(10) Patent No.: US 8,348,032 B2
(45) Date of Patent: Jan. 8, 2013

(54) COMPONENT FOR THE ABSORPTION OF ENERGY ON AN IMPACT

(75) Inventors: Johannes D. Jacob, Wilhelmsdorf (DE); Marco Wacker, Wilhermsdorf (DE)

(73) Assignee: Jacob Composite GmbH & Co. KG, Wilhelmsdorf (DE)

( * ) Notice: Subject to any disclaimer, the term of this patent is extended or adjusted under 35 U.S.C. 154(b) by 1044 days.

(21) Appl. No.: 11/597,944

(22) PCT Filed: Jun. 14, 2005

(86) PCT No.: PCT/EP2005/006362
§ 371 (c)(1),
(2), (4) Date: Nov. 28, 2006

(87) PCT Pub. No.: WO2005/123459
PCT Pub. Date: Dec. 29, 2005

(65) Prior Publication Data
US 2008/0257671 A1   Oct. 23, 2008

(30) Foreign Application Priority Data

Jun. 16, 2004 (EP) ...................................... 04014098

(51) Int. Cl.
*F16F 7/12* (2006.01)
(52) U.S. Cl. ...................... 188/377; 188/268; 267/140.1
(58) Field of Classification Search ................... 188/377
See application file for complete search history.

(56) References Cited

U.S. PATENT DOCUMENTS

| | | | |
|---|---|---|---|
| 3,779,592 A * | 12/1973 | Golze et al. ................... | 293/120 |
| 4,186,915 A | 2/1980 | Zeller et al. | |
| 4,601,367 A | 7/1986 | Bongers | |
| 5,269,574 A * | 12/1993 | Bhutani et al. ................ | 293/102 |
| 5,290,622 A * | 3/1994 | Tanabe .......................... | 428/182 |
| 5,514,448 A * | 5/1996 | Kishi et al. .................... | 428/166 |
| 5,697,657 A * | 12/1997 | Unrath, Sr. .................... | 293/118 |
| 6,247,745 B1 * | 6/2001 | Carroll et al. ................. | 188/371 |
| 6,569,509 B1 | 5/2003 | Alts | |
| 6,715,592 B2 * | 4/2004 | Suzuki et al. ................. | 188/371 |
| 6,729,451 B2 * | 5/2004 | Yamagiwa ..................... | 188/377 |
| 7,249,662 B2 * | 7/2007 | Itou ............................... | 188/377 |
| 2002/0046911 A1 * | 4/2002 | Sacks et al. ................... | 188/377 |
| 2002/0100651 A1 * | 8/2002 | Akiyama et al. .............. | 188/377 |
| 2004/0129518 A1 * | 7/2004 | Tamada et al. ................ | 188/377 |
| 2004/0140658 A1 * | 7/2004 | Kellas ........................... | 280/751 |
| 2005/0001093 A1 * | 1/2005 | Hayashi ...................... | 244/17.17 |

FOREIGN PATENT DOCUMENTS

| | | |
|---|---|---|
| DE | 2158086 | 5/1973 |
| DE | 3626150 A1 * | 2/1988 |
| WO | WO99/64231 | 12/1999 |

* cited by examiner

*Primary Examiner* — Robert A Siconolfi
*Assistant Examiner* — James Hsiao
(74) *Attorney, Agent, or Firm* — Alleman Hall McCoy Russell & Tuttle LLP

(57) ABSTRACT

The present invention relates to a component for the absorption of energy on an impact having a frame as well as having a section located in the frame and connected to the frame, with the section consisting of a multilayer fiber composite or comprising a multilayer fiber composite.

28 Claims, 2 Drawing Sheets

COMPONENT FOR THE ABSORPTION OF ENERGY ON AN IMPACT

CROSS-REFERENCE TO RELATED APPLICATIONS

Figure 1:
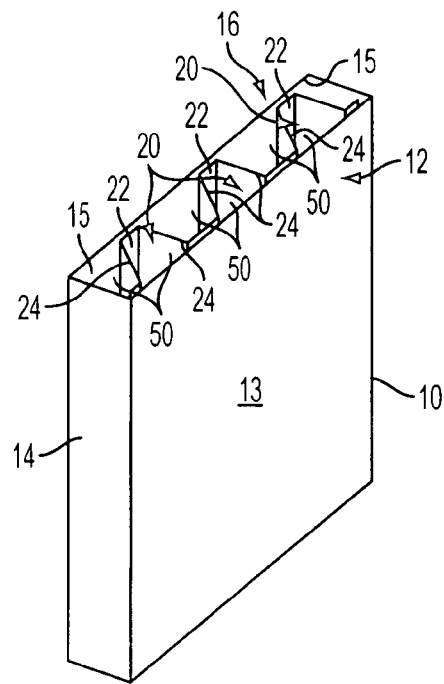

This is the U.S. national phase of International PCT Application Ser. No. PCT/EP2005/006362 filed Jun. 14, 2005, which in turn claims priority to European Patent Application Ser. No. 04 014 098.0 filed Jun. 16, 2004, both of which applications are hereby incorporated by reference in their entirety for all purposes.

The present invention relates to a component for the absorption of energy on an impact. Components of this type serve for the reduction of kinetic energy on an impact by essentially elastic or, as a rule, plastic deformation of the component. These "energy absorption members" are also termed crash members or crumple members in automobile construction. Crash members or crumple members are known in a number of different embodiments.

DE-OS 2 213 323 relates to a plastically deformable structure which consists of a stable-shape hollow body as well as a plastically deformable member which is made up of a plurality of sheets which are bonded or welded to one another. The sheets have a loop-shaped region which is located in the hollow body. In the event of an impact, the loop-shaped region passes through the hollow body. The energy to be applied for this purpose results in the reduction of the kinetic energy and thus in shock absorption. A further portion of the kinetic energy is reduced in that the connection points between the sheets break open.

An energy absorption member is known from DE 41 34 545 A1 in which two sections movable relative to one another are in connection to one another by a deformable, semi-rigid and tear-proof material strip. In the case of an impact, the kinetic energy is reduced by the release of the material strip from one of the surfaces of the sections and is not reduced by a plastic deformation of the sections—at least on an impact of a lower degree—which should bring about the advantage that the sections remain undamaged where necessary.

DE 2 158 086 A1 discloses a crumple member consisting of a plurality of layers or coats with sections made in wave-like or honeycomb-like form. The layers or coats are arranged perpendicular to the direction of impact.

A sandwich structure of a textile preform is known from DE 42 02 589 C1. The manufacture of the structure takes place in that the cover layers of the impregnated preform are connected to a base plate and a cover plate prior to curing. A molding pressure is initially exerted onto this structure. Subsequently, the spacing between the base plate and the cover plate is increased until the kernel threads are located in a specific alignment. The curvatures of the kernel threads reducing the sandwich height should be avoided in this manner.

A component on a velour fabric basis is known from DE-OS 37 23 681. The velour fabric consists of a technical yarn. It is cured, resinificated and has intermediate webs which connect the first layer of the fabric with a second layer. The component is light, comparatively stable, elastically deformable and can be used as a construction member as well as an insulation member.

EP 0 055 364 A1 discloses a crash protection component for the absorption of energy by plastic deformation. The component consists of an open hollow body whose jacket surface has a network of at least one fiber composite. In this connection, the fiber composite is present in a plurality of layers which can delaminate at their mutual intersections.

Previously known fiber composites which have good energy absorption properties can only be processed to form components for complex component demands with difficulty. Moreover, there is a lack of cost-effective and reliable processes for the finishing of these materials, in particular with aligned or oriented fibers for the high volumes typical in mass production. It is the underlying object of the present invention to provide an energy absorbing component which is of modular construction and can thus also be manufactured cost effectively with a complex geometry.

This object is solved by a component having the features of claim 1. Accordingly, the component has a frame as well as at least one section located in the frame and in connection to the frame, with the section consisting of a multilayer fiber composite or comprising a multilayer fiber composite. The fiber composite thus has two or more layers which, in the event of an impact, substantially absorb the kinetic energy by delamination, i.e. by separation of the layers.

The shape of the frame and of the section located therein can be as desired. Complex structures can also be implemented. The frame and/or the section are preferably made in areal form. The frame can, for example, have the shape of a hollow body rectangular or square in cross-section, with the section extending into its internal space. Other aspects of the frame can also be implemented.

The section and the frame can be made in one piece or also in a multiple of pieces.

The frame preferably consists of a hollow body bounded by walls and having open or closed end surfaces in whose longitudinal direction the section extends. The section can extend perpendicular to the end faces of the hollow body so that the narrow side of the section can be seen in the plan view of the end face of the frame. The end face of the frame is to be understood as that side of the frame which is adjacent to the frame walls and forms the base surface or cover surface of the frame. The end faces can be open or be covered by a plate.

The section is preferably made in an areal manner and can be formed, for example, by one or more plates which can be planar, curved or corrugated or even folded.

The frame is made as a hollow body of any desired design, preferably an areal hollow body. The section in accordance with the invention is located in the hollow space formed by the frame and preferably fills the hollow space in the width, height and longitudinal directions.

The section can be made in a simple manner, for example by shaping or folding. The frame can be made by folding, for example.

The fiber composite of the section and/or of the frame can consist of two or more layers of the same or different fiber or reinforcement type in the same or different fiber orientation.

The component in accordance with the invention is preferably oriented such that the impact direction lies in a plane formed by the section so that delamination of the section layers occurs on the impact.

The fiber composite can be a thermoplastic fiber composite. Generally, however, the use of thermosetting plastics is also conceivable.

The frame and the section can consist of the same material or also of different materials. It is, for example, conceivable that the frame and the section consist of a fiber composite or comprise such a fiber composite, with the fiber composite being able to consist of a plurality of layers of the same or different fiber or reinforcement type in the same or different fiber orientation.

Combinations of different materials are also conceivable. It is conceivable to provide the frame as a lightweight component and to make the section from a fiber composite.

The section is preferably made so that it forms two or more chambers in the frame. In this manner, a multichamber section is created, with the longitudinal axes of the chambers extending parallel or substantially parallel to the walls of the frame in a preferred embodiment of the invention. The number and shape of the chambers can be any desired. The chambers preferably have a size which permits the reception of the delaminated layers of the walls of the section respectively adjacent to the chamber. This effect results in a growing filling of the chambers as the degree of deformation increases, whereby a counter-force directed against the impact is exerted which results in the additional reduction of kinetic energy.

The section advantageously has mutually connected areal regions which are alternately in connection to oppositely disposed frame inner sides. The areal regions are preferably connected to one another by webs. The webs can stand perpendicular on the walls of the frame to which the areal regions are connected. An embodiment is preferred in which the webs extend at a different angle than a right angle to the said wall of the frame. In this case, an approximately zig-zag-shape section results in a plan view of the end face of the frame whose tips are flattened and which form areal regions by means of which the section is connected to the frame.

The connection technique for the connection of section and frame can be any desired. The connection of the section to the frame inner side by means of a conventional welding process can be considered, in particular by means of vibration welding, induction welding, radio frequency welding, ultrasonic welding, radiation welding or diffusion welding. Ultrasonic welding is in particular of importance in a connection metal fiber composite. Other joining techniques than welding, in particular by means of riveting, clinching or adhesive bonding, are also conceivable.

Provision is made in a further aspect of the invention for the weld seam to have a varying degree of consolidation. This can apply both to the weld seam connecting the section to the frame and to the weld seam connecting a plurality of frame parts to one another.

It is particularly preferred for the weld seam consolidation to increase as the spacing from the impact surface increases. The degree of consolidation of the weld seam can increase—preferably constantly or step-wise—as the spacing from the end face of the frame increases. Provision can accordingly be made for the frame to consist of a hollow body bounded by walls and having open or closed end faces and for the degree of consolidation of the weld seam to increase in the longitudinal direction of the hollow body. The regions of the partial consolidation or of the varying degree of consolidation can extend over the total length of the weld seam or also only over part regions.

The variation of the degree of consolidation of the weld seam results in a change in the weld quality (weld pressure) so that a moderate initial failure can be initiated.

The frame can be made in one piece. It is, however, advantageous, for the frame to be made in a plurality of parts, with the parts forming the frame being able to be connected by means of the connection technique in accordance with claim 8 or claim 9. It is, for example, conceivable that the frame consist of a substantially U-shaped base part which is connected to a plate which completes the U-shaped base part to form a peripheral frame. The base part can folded over in the end region of the limbs and the folded over regions can form the contact and connection surface for the plate.

The plate preferably consists of the same material as the component.

The section and/or the frame can consist of plastic fiber reinforced plastic or can comprise it, with the plastic fiber being able to be a polypropylene fiber. In addition to plastic fiber reinforcement, other reinforcement types such as by means of glass fibers, carbon fibers, aramide fibers, natural fibers or also steel fibers are conceivable.

It is particularly advantageous for the section and/or the frame to consist of at least regionally partially consolidated fiber composite. The partial consolidation is preferably influenced directly in the shaping process via the component thickness to be set. The degree of consolidation of the section and/or of the frame can increase—for example constantly or also step-wise—as the spacing from the end face of the frame increases. The variation of the degree of consolidation or the regions of consolidation can extend over part regions of the section or of the frame or over the total length of the section or frame. The partial consolidation can vary on one or both sides of the frame and/or section. In a preferred embodiment of the invention, the partial consolidation is made such that the regions facing the impact are partially consolidated and the degree of consolidation increases as the spacing from the impact surface increases, i.e. in the longitudinal direction of the hollow space formed by the frame. It can be achieved in this manner that initially a low energy absorption takes place and an increasing energy absorption takes place as the degree of deformation rises. The force introduction into the crash component in accordance with the invention can take place in a defined manner constantly without any unwanted indentation-caused initial strong increase of the force level by a direct setting of the degree of consolidation and of the consolidation transition. Furthermore, the desired delamination behavior can be initiated by the direct selection of the consolidation state.

It is furthermore advantageous for a plate terminating an end face of the frame to be provided. This can in particular close the end face of the frame which faces the impact direction. The plate can consist of a fiber composite, preferably of a thermoplastic fiber composite. It can consist of individual layers reinforced with glass fiber, carbon fiber, plastic fiber, natural fiber or of aramide fiber. Provision can likewise be made for the plate to divert higher energy amounts from the component to the outside by partial consolidation and to absorb some of the kinetic energy.

The invention furthermore relates to a vehicle having a component in accordance with one of the claims 1 to 18. The component is preferably arranged in the vehicle such that the plane or planes of the section received in the frame extend in the impact direction. The end face of the frame preferably stands perpendicular or substantially perpendicular to the impact direction.

The invention finally relates to the use of a component in accordance with one of the claims 1 to 18 as a crash member in a vehicle.

Further advantages and details of the invention will be explained with reference to an embodiment shown in the drawing.

Figure 2:
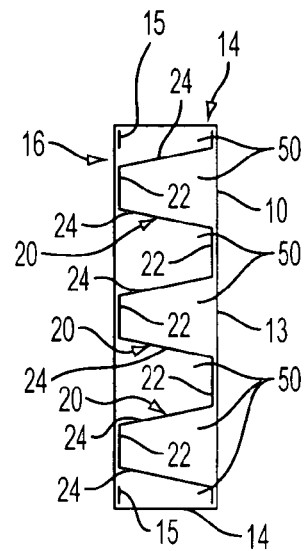
Figure 3:
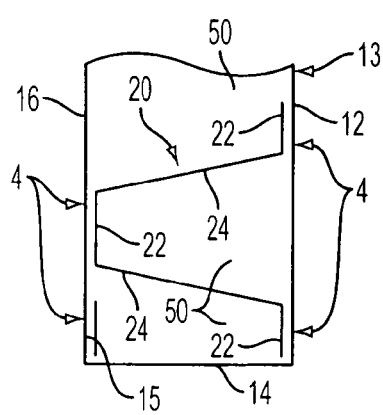
Figure 4:
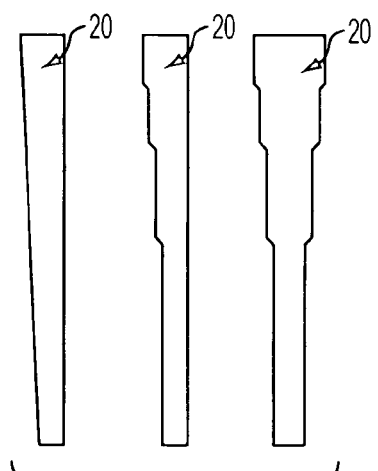
Figure 5:
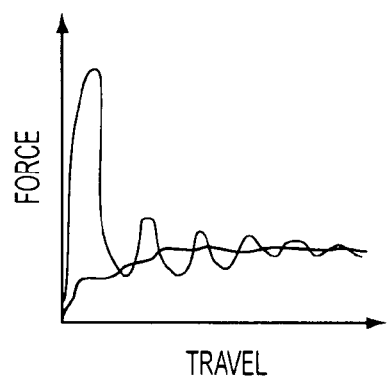
Figure 6:
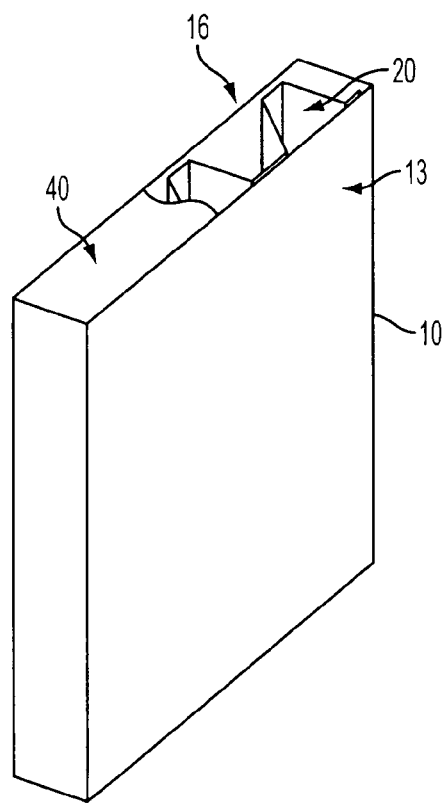

FIG. 1: a perspective view of a component in accordance with the invention;

FIG. 2 a plan view of the component of FIG. 1;

FIG. 3: an enlarged view of the lower end region of the component of FIG. 2;

FIG. 4: views of a longitudinal section through partially consolidated sections in different embodiments;

FIG. 5: a schematic view of the force-travel development on an impact for a crash member of the prior art and a component for the absorption of energy in accordance with the invention; and FIG. 6: a perspective view of a component of FIG. 1 having a plate terminating an end face of the component in a partially sectional representation.

FIG. 1 shows a component for the absorption of energy on an impact in accordance with the invention in a perspective view. The component has a frame 10 which consists of a component 12 U-shaped in cross-section and a cover plate 16 which completes the base part 12 to form a peripherally closed frame 10 with open end faces. The base part 12 consists of a rectangular base plate 13 at whose longitudinal sides standing in perpendicular in FIG. 1 the limbs 14 extend which run parallel to one another, stand perpendicular to the base plate 13 and are manufactured by folding. In their end region, folds 15 extending over the total length of the limbs 14 are provided which extend perpendicular to the limbs 14 and parallel to the base plate 13. The length of the limbs 14 corresponds to the length of the longitudinal sides of the base plate 13.

As can further be seen from FIG. 1-FIG. 3, the side of the base part 12 disposed opposite the base plate 13 is closed by the cover plate 16. The cover plate 16 is connected to the folds 15 by means of a conventional weld process. It has a dimensioning corresponding to the base plate 13.

The base part 12 and the cover plate 16 together form a frame 10 which is made in box shape and which is closed with the exception of the open end faces disposed at the top and bottom in FIG. 1. Any other designs of the frame are also conceivable in addition to the design of the frame shown in FIG. 1.

As can further be seen from FIG. 1 to FIG. 3, a section 20 which divides the frame inner space into a plurality of chambers 50 is located in the frame 10.

The section 20 consists of one or more plates shaped by folding or shaping.

The base part 12, the cover plate 16 and the section 20 consist of a thermoplastic fiber composite consisting of a plurality of layers of the same or different fiber type or reinforcement type in the same or different fiber orientation.

The section 20 has the planar strip-shaped regions 22 which can in particular be seen from FIG. 3 and extend parallel to the base plate 13 and the cover plate 16. The regions 22 extend in the longitudinal direction of the frame 10 and accordingly perpendicular to its end faces. They serve as joining surfaces at which the frame 10 is connected to the section 20. The connection takes place by means of a welding process.

The parts of the frame 10 and the profile 20 with the frame 10 can generally also be connected to one another by different connection techniques.

As can in particular be seen from FIG. 2, the strip-shaped regions 22 of the section 20 are alternately connected to oppositely disposed inner sides of the frame 10, i.e. alternatively to the base plate 13 and the cover plate 16.

The connection surfaces or joining surfaces of the frame 10 or of the frame 10 and the section 20 are marked by the reference numeral 4 in FIG. 3.

It can furthermore be seen from FIG. 1 to FIG. 3 that the webs 24 of the section 20 which connected the regions 22 to one another likewise extend in the longitudinal direction of the frame 10 and thus stand perpendicular to the frame end face. The webs 24 stand obliquely on the base plate 13 and cover plate 16 of the base part 12. They include an acute angle with the perpendiculars of the base plate 13 and the cover plate 16. It is also possible to arrange the webs 24 perpendicular to the base plate 13 and the cover plate 16. Generally, an angle is possible between the webs 24 and the frame 10 or the base plate 13 and cover plate 16 in the range from 0° to 90°, i.e. an alignment parallel or perpendicular to the frame 10. Furthermore, a varying angle is also possible as is present in round or rounded sections.

The length of the regions 22 and of the webs 24 corresponds to the length of the longitudinal sides of the frame 10, i.e. the upper edge of the section 20 visible from FIG. 1 lies in the plane which is formed by the end face of the frame 10. Furthermore, the section or sections 20 also fill the frame 10 in the width and vertical directions as can be seen from FIG. 1.

The section 3 of the embodiment in accordance with FIG. 1 to FIG. 3 is substantially based on a zig-zag design having flattened tips which serve as connection points 4 between the section 20 and the frame 10.

The structure in accordance with FIG. 1 to FIG. 3 consists of one or more open sections 30 which form chambers 50 in the frame 10. The chambers 50 have open sides which are located at the side of the frame 10 at which it has open end faces. The open sides of the chambers 50 and the end faces of the frame 10 can lie in one plane, for example, or in planes parallel to one another.

Instead of the embodiment shown, any other desired profiled section such as a wave-shaped or straight embodiment of the section is conceivable.

The section 20 as also the frame 10 consists of thermoplastic fiber composite consisting of a plurality of layers of the same or different fiber type or reinforcement type in the same or different fiber orientation. The section 20 is manufactured by folding or shaping.

The component in accordance with the invention in accordance with FIG. 1 to FIG. 3 is installed in a motor vehicle such that the open end face shown at the top in FIG. 1 forms the impact surface and stands perpendicular or substantially perpendicular to the impact direction. In the case of an impact, a delamination of the layers of the fiber composite, in particular of the section 20, takes place. Delamination is to be understood as the separation of the layers as a consequence of the absorption of the kinetic energy on the impact. In particular the webs 24 of the section 20 are separated into layers on the impact which are pushed in the respectively adjacent hollow chambers 50 of the component. The layers located in a hollow chamber 50 originate from the respective webs 24 adjacent to the hollow chambers 50 and increasingly fill the hollow chamber 50 as the impact progresses. This has the consequence that as the impact progresses, an increasing counter-force is set against the impact, which results in a further reduction of the kinetic energy.

FIG. 4 shows representations of a longitudinal section through partially consolidated sections 20 in different embodiments. The intersection line extends perpendicular to the end face of the frame. The front side of the section 20 which faces the impact and is arranged at the top in FIG. 4 is partly consolidated and accordingly has a larger thickness and a lower density. As can be seen from FIG. 4, at the left, the degree of consolidation can increase continuously (FIG. 4, left) or step-wise at one side (FIG. 4, center) or also step-wise at both sides (FIG. 4, right) as the spacing from the impact plane increases. A two-sided continuous variation is also possible. The frame 10 can have a consolidation corresponding to the section 20 or a partial consolidation.

The force introduction into the component can take place in a defined manner constantly without any unwanted indentation-induced first strong increase of the power level by the direct setting of the consolidation state and the consolidation transition. The latter is shown by the thinner of the two lines in FIG. 5. The thicker line shows the extent of the force level with the deformation path for a component in accordance with the invention with partly consolidated sections 20. The frame 10 can naturally also be made partly consolidated. An additional triggering or tuning would thus be unnecessary, but can nevertheless be carried out. A further advantage consists of the fact that the delamination behavior can be set directly over the degree of consolidation. The partly consolidated regions have a lower density and strength than the fully consolidated regions and therefore set a low counter force against the impact.

FIG. 6 shows an embodiment of the component in accordance with the invention in an aspect which substantially corresponds to FIG. 1 and in which one of the open end faces of the frame 10 is closed by a plate 40. The plate 40 can consist of a fiber composite, preferably of a thermoplastic fiber composite. It can consist of individual layers reinforced with glass fiber, carbon fiber, plastic fiber, natural fiber, steel fiber or of aramide fiber. Provision can likewise be made for the plate 40 to divert higher energy amounts from the component to the outside by partial consolidation and to absorb some of the kinetic energy on the impact.

The invention claimed is:

1. A component for absorbing energy on impact, the component comprising:
    a frame of plastic fiber composite defining a hollow space; and
    a sheet of plastic fiber composite arranged within the frame and connected to the frame by welding, the sheet having two or more layers and a shaped edge defining a surface,
    wherein the sheet is configured to receive at the shaped edge an impact force directed parallel to the two or more layers and normal to the surface, and to delaminate on receiving the impact force, and
    wherein upon receipt of the impact force, energy absorption takes place, increasing from a low initial value as deformation of the component increases, due to at least one of:
        (a) one or more of the sheet and the frame comprising a regionally partly consolidated fiber composite with a degree of consolidation increasing in a direction normal to the surface as distance from the surface increases; and
        (b) a weld quality varying along at least one weld seam between the sheet and the frame, the weld quality increasing in a direction normal to the surface as the distance from the surface increases.

2. A component in accordance with claim 1, wherein one or more of the frame and the sheet comprises a folded plate, and wherein the two or more layers are laminated together, and in the event of the impact, delaminate to absorb the energy.

3. A component in accordance with claim 1, wherein the frame comprises a hollow body bounded by walls and having open or closed end faces, and wherein the sheet extends in a longitudinal direction.

4. A component in accordance with claim 1, wherein the plastic fiber composite comprises a thermoplastic fiber composite.

5. A component in accordance with claim 1, wherein the frame and the sheet comprise the same material.

6. A component in accordance with claim 1, wherein the sheet forms two or more chambers in the frame.

7. A component in accordance with claim 1, wherein the sheet comprises a plurality of tip regions alternately connected to oppositely disposed inner sides of the frame, and wherein the tip regions are oriented in parallel and in a longitudinal direction.

8. A component in accordance with claim 7, wherein the sheet is connected to the oppositely disposed inner sides by vibration welding, induction welding, radio frequency welding, ultrasonic welding, radiation welding or diffusion welding to form at least one weld seam.

9. A component in accordance with claim 8, wherein a weld quality varies along the at least one weld seam.

10. A component in accordance with claim 9, wherein the weld quality increases in the longitudinal direction.

11. A component in accordance with claim 7, wherein one or more of the sheet and the frame comprise fiber reinforced plastic.

12. A component in accordance with claim 11, wherein the one or more of the sheet and the frame comprise glass fibers, carbon fibers, aramide fibers, natural fibers or steel fibers.

13. A component in accordance with claim 11, wherein the one or more of the sheet and the frame comprise a regionally partly consolidated fiber composite.

14. A component in accordance with claim 13, wherein a degree of consolidation of the one or more of the sheet and the frame increases in the longitudinal direction.

15. A component in accordance with claim 14, wherein the degree of consolidation increases constantly or step-wise.

16. A component in accordance with claim 1, further comprising a plate terminating an end face of the frame.

17. A vehicle comprising the component in accordance with claim 7.

18. A vehicle in accordance with claim 17, wherein the component is arranged in the vehicle such that the longitudinal direction coincides with the direction of the impact force.

19. A method for absorbing kinetic energy on impact in a vehicle using a component as a crash member, the component including a frame of plastic fiber composite defining a hollow space and a sheet of plastic fiber composite arranged within the frame and connected to the frame by welding, the sheet having two or more layers and a shaped edge defining a surface, the method comprising:
    receiving at the shaped edge an impact force directed parallel to the two or more layers and normal to the surface, and to delaminate on receiving the impact force; and
    absorbing energy upon receipt of the impact force such that energy absorption increases from a low initial value as deformation of the component increases, due to at least one of:
        (a) one or more of the sheet and the frame comprising a regionally partly consolidated fiber composite with a degree of consolidation increasing in a direction normal to the surface as distance from the surface increases; and
        (b) a weld quality varying along at least one weld seam between the sheet and the frame, the weld quality increasing in a direction normal to the surface as the distance from the surface increases.

20. A component in accordance with claim 1, wherein the sheet comprises a shaped plate.

21. A component in accordance with claim 2, wherein the one or more of the frame and the sheet comprises a planar area.

22. A component in accordance with claim 7, wherein the tip regions comprise flattened tip regions.

23. The method of claim 19, wherein the sheet comprises a plurality of tip regions alternately connected to oppositely disposed inner sides of the frame, wherein the tip regions are oriented in parallel and in a longitudinal direction, and wherein the longitudinal direction coincides with a direction of the impact.

24. The method of claim 19, wherein the sheet forms one or more hollow chambers into which adjacent layers of the sheet are pushed on impact, and wherein the delaminated adjacent layers increasingly fill the one or more hollow chambers as the impact progresses.

25. A component in accordance with claim 1, wherein the plastic fiber composite comprises a thermosetting plastic fiber composite.

26. A component in accordance with claim 1, wherein the sheet divides the hollow space into a plurality of hollow chambers on both sides of the sheet, wherein the hollow chambers are arranged parallel to the impact force, and wherein the sheet is configured such that on delaminating, the two or more layers are received into the hollow chambers.

27. The method of claim 19, wherein the sheet divides the hollow space into a plurality of hollow chambers on both sides of the sheet, wherein the hollow chambers are arranged parallel to the impact force, and wherein the sheet is configured such that on delaminating, the two or more layers are received into the hollow chambers.

28. A component for absorbing energy on impact, the component comprising:
   a frame of plastic fiber composite defining a hollow space; and
   a sheet of plastic fiber composite arranged within the frame and connected to the frame by welding, the sheet having two or more layers and a shaped edge defining a surface, a weld quality increasing along at least one weld seam between the sheet and the frame in a direction normal to the surface as the distance from the surface increases,
   wherein the sheet is configured to receive at the shaped edge an impact force directed parallel to the two or more layers and normal to the surface, and to delaminate on receiving the impact force; and
   wherein upon receipt of the impact force, energy absorption takes place, increasing from a low initial value as deformation of the component increases.

* * * * *